United States Patent [19]

Ofer et al.

[11] Patent Number: 5,742,789
[45] Date of Patent: Apr. 21, 1998

[54] DYNAMICALLY ADAPTIVE DATA RETRIEVAL FOR A DISK DRIVE STORAGE SYSTEM

[75] Inventors: Erez Ofer; Natan Vishlitzky, both of Brookline; John Fitzgerald, Mansfield, all of Mass.

[73] Assignee: EMC Corporation, Hopkinton, Mass.

[21] Appl. No.: 579,811

[22] Filed: Dec. 28, 1995

[51] Int. Cl.⁶ .......................................... G06F 12/00
[52] U.S. Cl. .................. 395/438; 395/463; 395/453; 395/495; 395/444; 364/DIG. 1
[58] Field of Search ......................... 395/444, 445, 395/463, 823

[56] References Cited

U.S. PATENT DOCUMENTS

| | | | |
|---|---|---|---|
| 4,005,389 | 1/1977 | Penzel | 340/172.5 |
| 4,476,526 | 10/1984 | Dodd | 364/200 |
| 4,667,286 | 5/1987 | Young et al. | 364/200 |
| 4,723,223 | 2/1988 | Hanada | 364/900 |
| 4,800,483 | 1/1989 | Yamamoto et al. | 364/200 |
| 4,964,046 | 10/1990 | Mehrgardt et al. | 364/200 |
| 5,047,920 | 9/1991 | Funabashi | 364/200 |
| 5,121,479 | 6/1992 | O'Brien | 395/250 |
| 5,179,662 | 1/1993 | Corrigan et al. | 395/250 |
| 5,206,939 | 4/1993 | Yanai et al. | 395/400 |
| 5,210,829 | 5/1993 | Bitner | 395/250 |
| 5,337,414 | 8/1994 | Hashemi et al. | 395/275 |
| 5,353,430 | 10/1994 | Lautzenheiser | 395/444 |
| 5,396,597 | 3/1995 | Bodin et al. | 395/275 |
| 5,412,780 | 5/1995 | Rushton | 395/250 |
| 5,483,641 | 1/1996 | Jones et al. | 395/823 |
| 5,537,568 | 7/1996 | Yanai et al. | 395/445 |
| 5,542,066 | 7/1996 | Mattson et al. | 395/463 |

Primary Examiner—Tod R. Swann
Assistant Examiner—David Langjahr
Attorney, Agent, or Firm—Fish & Richardson P.C.

[57] ABSTRACT

An apparatus and method for retrieving a data file from a disk drive storage which provide for overlapping read operations thereby reducing the latency seen by a requesting host computer. The host computer requests the retrieval of a data file and a channel director places that request in a data cache. If the data file is not in the data cache, a disk director reads and transfers the data file from the disk drive to the data cache. At a certain point in the transfer of the data file into the data cache, the disk director places a start read message in the data cache which is then read by the channel director. Upon receipt of the start read message, the channel director begins to read the data file from the data cache, thus reading data from the data cache as the disk director completes writing the data file to the data cache. The channel director can adaptively modify the starting point for reading the data files depending upon the "success" rate of previous read operations. The success rate translates into increasing or decreasing a parameter representing the percentage of the data file which must be placed in data cache before the channel director can begin reading from the cache. The percentage varies between 50% and 100% to maintain a "success" rate between, preferably, 85% and 95%.

18 Claims, 3 Drawing Sheets

DYNAMICALLY ADAPTIVE DATA RETRIEVAL FOR A DISK DRIVE STORAGE SYSTEM

BACKGROUND OF THE INVENTION

The invention relates generally to retrieving data stored on disk drives, and more particularly, to a method and apparatus for retrieving data records stored in a disk drive storage medium using intermediate cache memory.

Cache memory is used in data storage systems so that, under typical conditions, a relatively large and slower main disk drive storage can be accessed at a relatively higher data rate by the main processor or host. The cache memory is a high speed memory, small relative to the storage capacity of the disk drives with which it will communicate, that can store at any given time a portion of the data stored in the main disk drive storage. The data storage system will also include a cache directory or index of the data elements. The cache directory can be referenced to provide an indication of whether or not a data element is located in the cache memory at any given time, and if so, its present location or slot in the cache memory.

The data storage system is responsive to data access requests from one or more host computers. The data access requests will include, generally, both read and write requests. When a data storage system having a cache memory receives a request for data, if the data is not in the cache memory, the storage system accesses the data in its main disk drive memory and copies or "stages" the retrieved data into cache memory. Once the data has been stored in cache memory, a flag generally indicates to a channel director that the data can now be accessed from cache memory at a high data rate for transmission to the host computer.

Data storage systems that use disk drives as the main memory will typically use random access memory (RAM) for the cache memory. In such data storage systems, the data elements in the cache memory are often logical tracks of data on the disk drives, although in some systems the data elements are blocks or records of data. Each data element can be stored in any one of a multiplicity of slots in the cache memory. Typically, a cache memory manager manages the storage and replacement of data in the cache memory.

The delay between when a host requests data from memory and the time that it receives the data, designated the latency, is vastly improved if the data is already in the cache memory. However, when the data is not in cache memory, the host must wait until the entire requested data are retrieved from the main storage disk drive memory and are fully loaded into the cache memory. Thereafter, the channel director reads the data from the cache memory, at a high rate, and delivers it to the host.

Since the latency issue is a potentially severe limitation on the throughput and speed of the main CPU at the host computer, various methods have been used to either increase the likelihood that the required data record is in cache memory or to reduce the latency in reading from the disk drive. Thus, for example, control systems have been provided which enable the host computer to begin receiving data from the cache memory at a time prior to when all of the requested data has been placed into cache memory. Some of these systems provide a threshold which is selected for identifying the beginning of an unload cycle and which permits the buffer memory contents to be completely transferred through the higher speed cache to host channel during time when additional data is being accumulated from the disk drive to the cache memory. Indeed, in at least one instance the threshold selection is adaptive based on the length of one or more previously transferred data blocks. In this system, the threshold thus becomes an absolute value at which time buffer memory begins to be unloaded to the higher channel speed (independent of the amount of current data being retrieved). This reduces the latency seen by the host.

SUMMARY OF THE INVENTION

The use of an adaptive threshold based upon the length of previously read records leads to a conservative, but clearly not optimal, approach to reduce the latency which the host sees in reading data from a disk drive unit. Accordingly, the invention relates to a method and apparatus for retrieving a data file from a disk drive storage. The method features the steps of sending a request for retrieving a data file, the data file having at least one data block, for storage in a data cache mail box location, the request identifying the location and size of the data file, and including an adaptive read start parameter value. The method further features reading the request from the mail box location and initializing the retrieval of data from the disk drive to the data cache; inserting a read start message in the data cache mail box at a time based upon the read start parameter value and the size of the data file to be retrieved, indicating when data can begin to be read from the data cache; polling the data cache mail box for the read start message; and reading data from the data cache for delivery to the host upon detection of the read start message in the data cache mail box.

The method further features adaptively changing the value of the read start parameter value depending upon the parameter value, and the relative ending times of the reading and retrieval steps, at the data cache, for more closely enabling the reading and retrieval steps to end at substantially the same time.

In a preferred embodiment of the invention, the parameter value is between $80_{hex}$ and $FF_{hex}$. This number is divided by $100_{hex}$ to obtain the ratio (percentage) which the disk drive director or controller should use to calculate when to place the read start message in the data cache mail box. In the preferred embodiment of the invention, the adaptive read start value is updated every 4096 read operations or every five minutes, whichever comes first. In the preferred embodiment, if there is to be an increase in the parameter value, it is increased by four units, and if there is to be a decrease in the parameter value, it is decreased by one unit. This is the equivalent of a fast attack, slow decay filter. If the "success" rate (a "success" occurs when the read from cache to host operation ends after the drive retrieval operation ends) is less than 85%, the parameter value is incremented (that is, the channel director will start reading from cache later). If the success rate is greater than 95%, the parameter value is decremented (the channel director will start reading from cache earlier). If the success rate is within the range of 85%–95%, the adaptive read start parameter value is not changed. Finally, for any read which involves less than 16 kilobytes, the latency reduction method described herein is not used.

The invention further relates to an apparatus for retrieving data from a disk drive storage media. The apparatus features a channel director which receives a request from the host computer, for reading a data file from a data drive. The channel director sends the request to a data cache mail box location. The data file has at least one data block, and the request identifies at least the location and size of the data file and includes an adaptive read start parameter value. The apparatus further features a disk director for retrieving the request from the mail box location and initializing and controlling the transfer of data from the disk drive to the data cache. The disk director inserts a read start message in the data cache mail box based upon the read start parameter value and the size of the data file to be read, thus indicating to the channel director when the data can begin to be read from the data cache. The channel director continuously polls the data cache mail box for the read start message; and the channel director, upon receipt of the read start message, initiates the reading of data from the data cache.

BRIEF DESCRIPTION OF THE DRAWINGS

Other objects, features and advantages of the invention will be apparent from the following description in view of the drawings in which.

DESCRIPTION OF THE PREFERRED PARTICULAR EMBODIMENT

Figure 1:
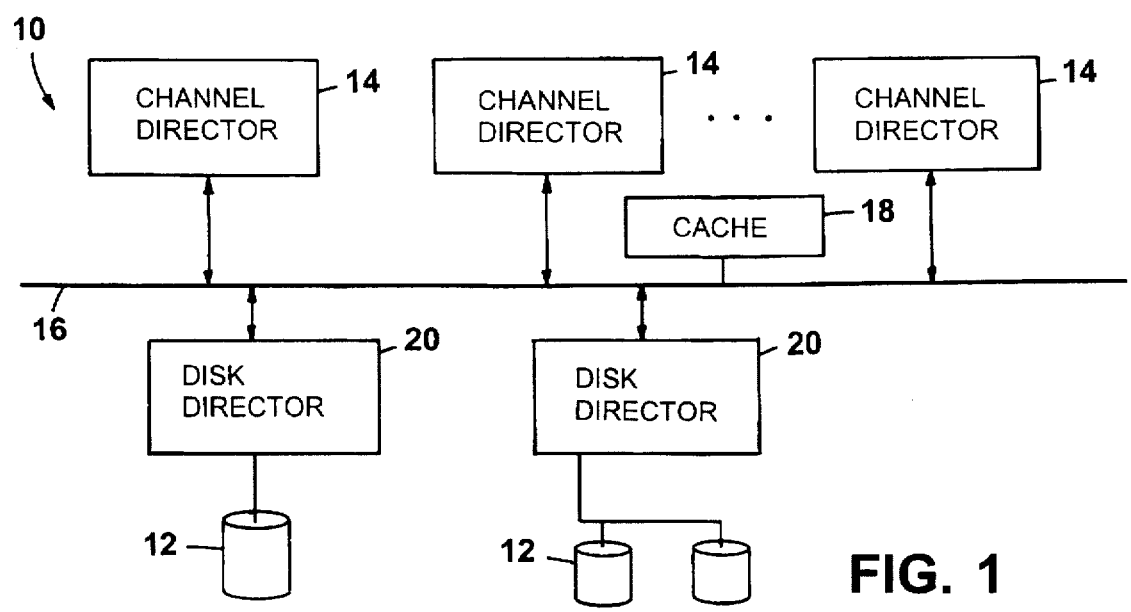
FIG. 1 is a general block diagram of the environment in which the invention is most useful.

In accordance with the present invention, referring to FIG. 1, a disk storage system 10 for reading and writing data on one or more disk drive units 12 employs a plurality of channel directors 14 communicating over a bus 16 with a cache memory 18 and disk directors 20. The disk directors 20 connect to the disk drive units 12 for both reading or retrieving data files from the disk drives and writing data files to the disk drives. Each of the disk drive units 12 includes one or more disk drives depending upon a user's requirements.

In operation, upon receipt of a read or write request from a host computer, a channel director 14 places a data command having a selected protocol in the cache memory, and in particular, in a section of the cache memory for receiving such commands which is designated herein as the "mail box". The mail box includes a plurality of designated information elements, including various flags, which are polled by the disk directors. The disk directors, in response to the requirement from the channel director to read or write data, provide that service to the system. In this illustrated embodiment of the invention, which is directed to the reading or retrieval of data from the disk drives, only that portion of the operation of the system will be described.

In operation, when the disk director receives a read request which has been previously placed in the cache mail box, the disk director accesses and begins to transfer the requested data from the disk drive, placing the retrieved data in the appropriate part of the cache memory (the correct cache slot as directed by a cache management system (not shown)) and calculates a parameter read value, based upon the read start parameter value placed in the mail box by the channel director. The parameter read value identifies the time at which the disk director sets a signal, typically a flag in the data cache mailbox, which is used by the channel director to initiate reading of data from the data cache. The "time" is dependent upon the rate data transfer into the cache by the system and is dependent upon the length of the transfer as well. The entire system operates so that the reading of data by the channel director from cache overlaps a portion of the time during which data is being retrieved from the disk drive and read into the cache by the disk director (also known as the back end). In this manner, latency seen by the host computer is reduced.

Figure 2:
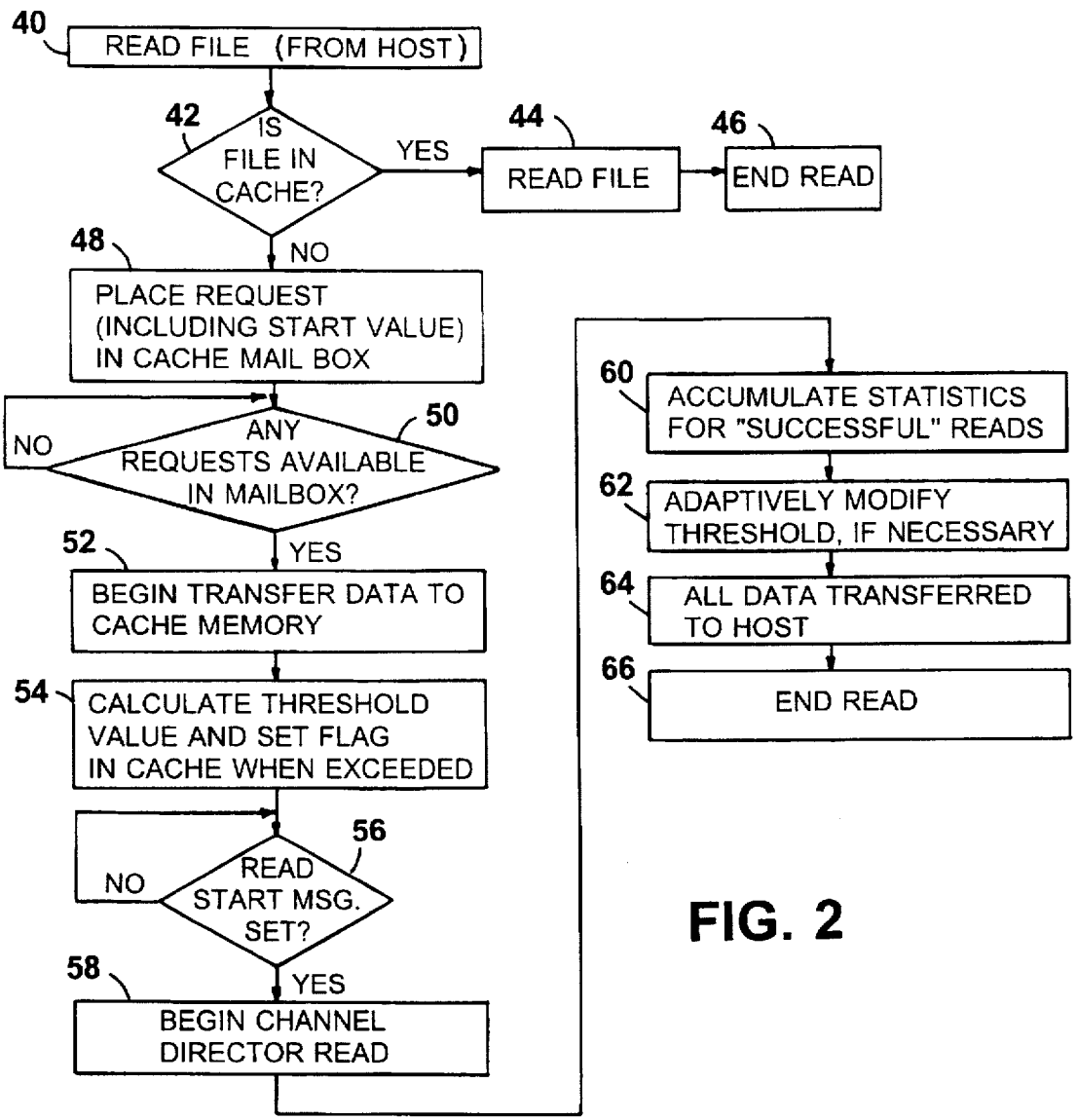
FIG. 2 is a flow chart illustrating operation in accordance with a preferred embodiment of the invention.

Referring to FIG. 2, in considering the entire read operation in greater detail, the read operation begins with a request from a host computer, indicated at 40, to read a specified data file. Since the request is directed over a channel to a channel director, the channel director communicates with the cache memory management system to determine whether the requested file is in cache. This is indicated at 42. If the file is in cache, the file is read at 44 and the read operation terminates at 46. If the file is not in cache, the channel director places a read request in the cache read mail box. The request includes the identification of the file to be read, including its location and length, as well as an adaptive read start parameter value which represents a percentage number. This is indicated at 48. The act of placing the request in the cache mail box raises a flag which is read by the disk director. The disk director is constantly polling the cache mail box(es) to determine whether any requests are present. This is indicated at 50. The disk director then reads the outstanding read request, identifies the location on disk at which the required file(s) are located, and begins transferring data to the cache memory. This is indicated at 52.

Simultaneously, the disk director also calculates, from the start parameter value in the cache mail box, a value, which when surpassed by the number of bytes transferred from the disk drive to the cache, enables the disk director to place a flag in the cache mail box designating to the channel director that it can begin reading the retrieved and requested data from the cache memory. This operation is performed at 56. Upon a successful recognition of the read start message, by the constantly polling channel director, the channel director begins reading the data from the cache memory at 58. If the data is read without stalling, that is, if the data is read so that the channel director terminates its cache read operation after the disk director has retrieved and loaded all of the data into the cache, then a "successful" read has been attained. The channel director accumulates the statistics for the "successful" (and "unsuccessful") reads and based on those statistics may adaptively modify the read start parameter value as necessary (at 62). Thereafter, since all data has all been transferred to the host at 64, and the read request from the host has been satisfied, the read session will end as indicated at 66.

Figure 3:
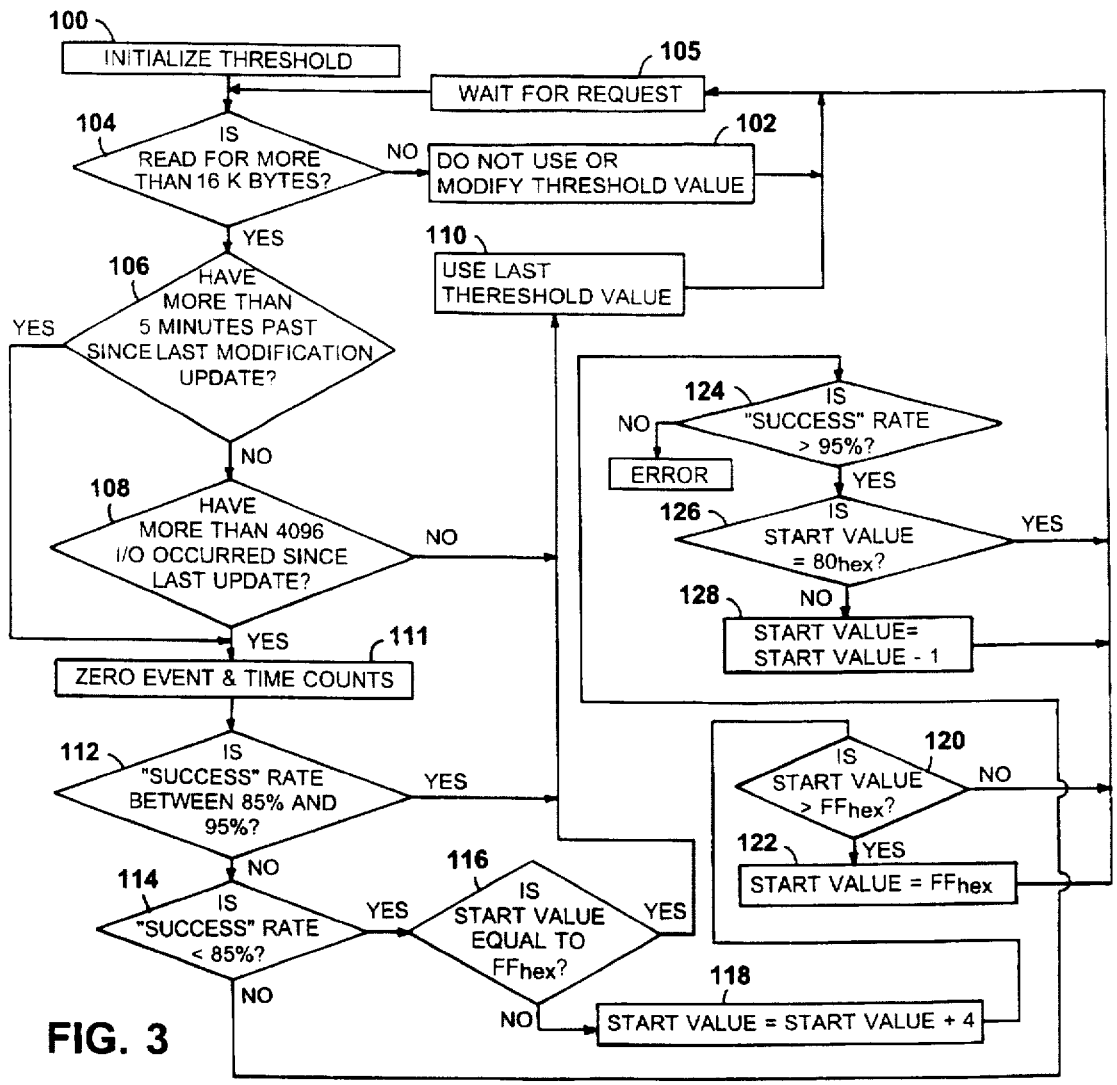
FIG. 3 is a flow chart illustrating the adaptation of the read start parameter value in accordance with a preferred embodiment of the invention.

The manner in which the read start parameter value is modified tends to be central to and critical for the efficient throughput of data being read from the storage system and essential in reducing, to an optimal value, within practical limits, the latency which the host computer experiences. Referring to FIG. 3, the read start parameter value is initialized at an upper threshold limit of $FF_{hex}$, as indicated at 100. The read start parameter value is not allowed to increase above this level. Thereafter, for each incoming read request, the channel director first checks that the read request is for more than 16 Kbytes. If the transfer is for less than 16 kilobytes, not only is the threshold not modified, as indicated at 102, but the overlapping read process is not used.

Thus, if the read request is not for more than 16 kilobytes, as determined at 104, the start parameter value, according to the method described above is not used nor is the start parameter value modified. Thereafter, the channel director waits for a next read request, indicated at 105, at which time the process begins again. If the read request is for more than 16 kilobytes, then the system checks to determine whether more than five minutes have passed since the last time the start parameter value was considered for modification and updating. This is indicated at 106. If more than five minutes have passed, then the "success" rate is checked as described below; otherwise, the system checks to determine whether more than 4,096 (in the preferred embodiment of the invention) read operations have occurred since the last parameter update. This is indicated at 108. If less than 4,096 input/output operations have occurred since the last update, the last start parameter value is used, as indicated at 110, and the system waits for a next read request, as indicated at 105.

If sufficient time or number of read events have taken place to effect a consideration of a modification or update of the start parameter value, the read events and the time are zeroed at 111, and the "success" rate is examined, initially at 112, to determine whether it is between 85% and 95%. If it is between 85 and 95%, the system remains satisfied with the current value of the adaptive read start parameter value and uses that value for the next read request. At this point, the system resets both the number of read events and the time so that another modification will not immediately take place. If the "success" rate is not between 85% and 95%, then, at 114, the system checks to determine whether it is less than 85 percent. If it is, the system then checks, at 116, the start parameter value to determine whether it is now at the maximum value in which case it will not be modified. If the start parameter value is not at its maximum value, in the illustrated embodiment of the invention, the start parameter value is incremented by "four", at 118, checked to determine whether the maximum is exceeded, at 120, and if it is, the start value is set to the maximum, ($FF_{hex}$ in this illustrated embodiment), at 122. Thereafter, the current read request is processed after which, the channel director waits for a next read request.

If the "success" rate is not less than 85%, then the system determines whether it is greater than 95% and if it is, checks whether the start parameter value is at its minimum, that is, whether it is at $80_{hex}$. This is indicated at 124, 126. If the start parameter value is at its minimum, it is not decremented and the system continues to use that start parameter value. Otherwise, the channel director, at 128, decrements the start parameter value by "one" and that new start parameter value is used thereafter.

In this manner, the channel director modifies, dynamically and adaptively, the start parameter value which is then divided by $100_{hex}$ to provide a percentage. That division process is performed by the disk director which then multiplies that percentage value times the size of the file to be read. The result of the division determines when the flag, indicating that the channel director can begin reading the data being stored in the cache, can be set.

Thus, the invention describes what can be called a fast attack, slow decay filter process for varying the parameter value in response to the "success" of the current value, increasing it somewhat rapidly but decreasing it slowly. This has been found to achieve superior results in practice, in particular when the data files vary in size. The potential instability, when the start parameter value is varies too quickly, can have the effect of increasing latency, in the long run.

Modifications of the above described embodiment, including different parameter limitations, and increment and decrement values can be made by one practiced in this field, and are within the scope of the following claims.

What is claimed is:

1. A method for retrieving a data file from a disk drive storage media comprising the steps of sending a request for reading said data file, comprising at least one data block, for storage in a data cache mail box location, said request identifying the location and size of said data file and including an adaptive read start parameter value, reading said request from said mail box location and initializing the transfer of data from said disk drive to a data cache, inserting a read start message in said data cache mail box, at a time based upon said read start parameter value and the size of the data file to be retrieved, indicating that data can begin to be read from said data cache, polling said data cache mail box for said read start message, and reading data from said data cache upon detection of said read start message in the data cache mail box.

2. The method of claim 1 further comprising the steps of adaptively changing the value of said read start parameter value, depending upon the "success" rate for reading from said data cache.

3. The method of claim 2 wherein said adaptively changing step further comprises the step of increasing said parameter value if said "success" rate is less than 85% and decrementing said parameter value if the "success" rate is greater than 95%, the "success" rate being the percentage of time since a last opportunity to modify said parameter value, that the read operation from data cache to the host finished after the write from disk to data cache.

4. The method of claim 3 further comprising the step of adaptively changing said parameter value when either a selected number of read requests have been handled by the system since the last opportunity to modify said parameter value or a selected period of time has passed since the last opportunity modify said parameter value.

5. The method of claim 4 further comprising the steps of maintaining said percentage value between 50% and 100%.

6. The method of claim 2 further comprising the step of inhibiting said adaptively changing step when the length of the data file is less than a fixed size.

7. The method of claim 2 further comprising the step of inhibiting said adaptively changing step whenever the "success" rate is between 85% and 95%.

8. The method of claim 4 where said selected number is greater than 4096, said selected period is greater than 5 minutes, and said length of said data file is a fixed size of at least 16 Kbytes.

9. Apparatus for retrieving data from a disk drive comprising a disk drive storage medium, a data cache, a disk director for responding to a request in said data cache for retrieving data from the disk drive and delivering the data to the data cache, a host processor for initiating a read request to a channel director, a channel director for responding to the read request for sending a data request to said data cache, said data request including a start parameter value, the location of the requested data file and the length of the data file, and responding to a start data read message in said data cache for initiating the reading of said data file from said data cache, said disk director responding to said start parameter value and the length of the data file for placing said start data read message in said data cache when an amount of the data file corresponding to said parameter value and said data file length has been placed in said data cache, and said channel director adaptively changing said start parameter value in response to a determined "success" rate.

10. The apparatus of claim 9 further wherein said disk director converts said parameter value to a percentage of the data file being retrieved from said disk drive.

11. The apparatus of claim 10 wherein said channel director further comprises means for increasing said parameter value if said "success" rate is less than 85% and decrementing said parameter value if the "success" rate is greater than 95%, the "success" rate being the percentage of time since a last opportunity to update said parameter, that the read from data cache to said host finished after the write from disk to said data cache.

12. The apparatus of claim 11 further wherein said channel director comprises means for adaptively changing said parameter value when either a selected number of read requests have been handled by the system since the last opportunity to modify the parameter value or a selected period of time has passed since the last opportunity to modify the parameter value.

13. The apparatus of claim 12 wherein the channel director further comprises means for maintaining said percentage value between a value of 50% and 100%.

14. The apparatus of claim 12 wherein said selected number is at least 4096, and said selected period is greater than at least five minutes.

15. The apparatus of claim 10 further comprising at the channel director, means for inhibiting said adaptively changing of said parameter value when the length of the data file is less than a selected data file length.

16. The apparatus of claim 10 further comprising said channel director inhibiting any change of said parameter value whenever the "success" rate is between 85% and 95%.

17. The apparatus of claim 9 wherein the channel director continuously polls the data cache for said start data read message.

18. The method of claim 2 further comprising the step of converting said parameter value to a percentage of said data file being retrieved from said disk drive.

* * * * *